United States Patent [19]

Chao

[11] Patent Number: 5,435,977
[45] Date of Patent: Jul. 25, 1995

[54] ACID GAS REMOVAL SYSTEM EMPLOYING REGENERATOR WITH INTERNAL FLASH SECTION

[75] Inventor: I-Meen Chao, Overland Park, Kans.

[73] Assignee: Eickmeyer & Associates, Inc., Overland Park, Kans.

[21] Appl. No.: 167,237

[22] Filed: Dec. 15, 1993

[51] Int. Cl.⁶ .................... B01D 50/00; F28D 21/00; C01B 17/16

[52] U.S. Cl. .................... 422/171; 422/178; 422/205; 422/228; 422/236; 55/228; 423/223

[58] Field of Search ............. 422/171, 173, 175, 178, 422/205, 206, 228, 236; 55/228, 229; 95/187, 191, 192, 203, 264; 96/194, 197, 198; 423/223, 228, 229, 232, 242, 243

[56] References Cited

U.S. PATENT DOCUMENTS

| | | | |
|---|---|---|---|
| 2,838,383 | 6/1958 | Wistrich | 422/236 X |
| 3,492,787 | 2/1970 | McMinn | 95/191 |
| 3,615,199 | 10/1971 | Terrana | 55/228 X |
| 3,851,041 | 11/1974 | Eickmeyer | 423/223 |
| 3,856,487 | 12/1974 | Perez | 55/228 X |
| 3,896,212 | 7/1975 | Eickmeyer | 423/223 |
| 3,901,957 | 8/1975 | Levy | 55/228 X |
| 3,932,582 | 1/1976 | Eickmeyer | 423/223 |
| 4,193,967 | 3/1980 | Black | 422/170 |
| 4,271,132 | 6/1981 | Eickmeyer | 423/223 |
| 4,430,312 | 2/1984 | Eickmeyer | 423/223 |
| 4,589,889 | 5/1986 | Spencer | 55/229 X |
| 5,130,102 | 7/1992 | Jones, Jr. | 422/191 |
| 5,145,658 | 9/1992 | Chao | 423/223 |

OTHER PUBLICATIONS

TPC Proposal, Applicant's two-page business proposal to the Prichard Corporation (TPC), Overland Park, Kansas pp. 1 and 2 (Nov. 6, 1992).

Fish Proposal, Applicant's four-page business proposal to Fish Engineering, Houston, Texas pp. 1–4 (Nov. 16, 1992).

*Primary Examiner*—Robert J. Warden
*Assistant Examiner*—Christopher Y. Kim
*Attorney, Agent, or Firm*—Bryan Cave

[57] ABSTRACT

An acid gas removal process employing a regenerator with an internal flash section is described. The regenerator uses gravitational flow to feed the flash section, eliminating the need for an external flash tank, and charge pump even without vacuum. The internal flash section has a first pressure side, a second pressure side having a lower pressure than the first pressure side during gas flow and a pressure reduction zone disposed therebetween. The pressure drop in the pressure reduction zone is due to liquid flow pressure losses occurring as liquid flows from said first pressure side to said second pressure side. A liquid seal between the first pressure and second pressure sides eliminates the need for a pressure let down valve. Vacuum control is provided by the first pressure side liquid level.

20 Claims, 4 Drawing Sheets

ACID GAS REMOVAL SYSTEM EMPLOYING REGENERATOR WITH INTERNAL FLASH SECTION

FIELD OF THE INVENTION

The invention relates to an improved process and apparatus for the removal of acid gases from gas mixtures.

BACKGROUND

Processes employing a modified potassium salt solution containing various types of catalysts and corrosion inhibitors are known. See U.S. Pat. Nos. 5,145,658, 4,430,312, 4,271,132, 3,932,582, 3,896,212 and 3,851,041. The catalysts greatly increase the rate of absorption and desorption of acid gases, thereby reducing equipment sizes, capital costs, utility requirements and residual $CO_2$ and $H_2S$ contents.

The most common use is in ammonia, hydrogen, LNG and ethylene oxide plants. Users can purify sour gas streams by removing $CO_2$, $H_2S$ or COS. Purified gas under adequate pressure can contain less than 4 ppm of $H_2S$ and between 0.005% and 2% of $CO_2$. In the absence of sulfur compounds, the recovered high purity $CO_2$ is suitable for making urea, liquid $CO_2$ or dry ice for beverage use and enhanced oil recovery.

DETAILED DESCRIPTION OF THE PREFERRED EMBODIMENTS

Figure 1:
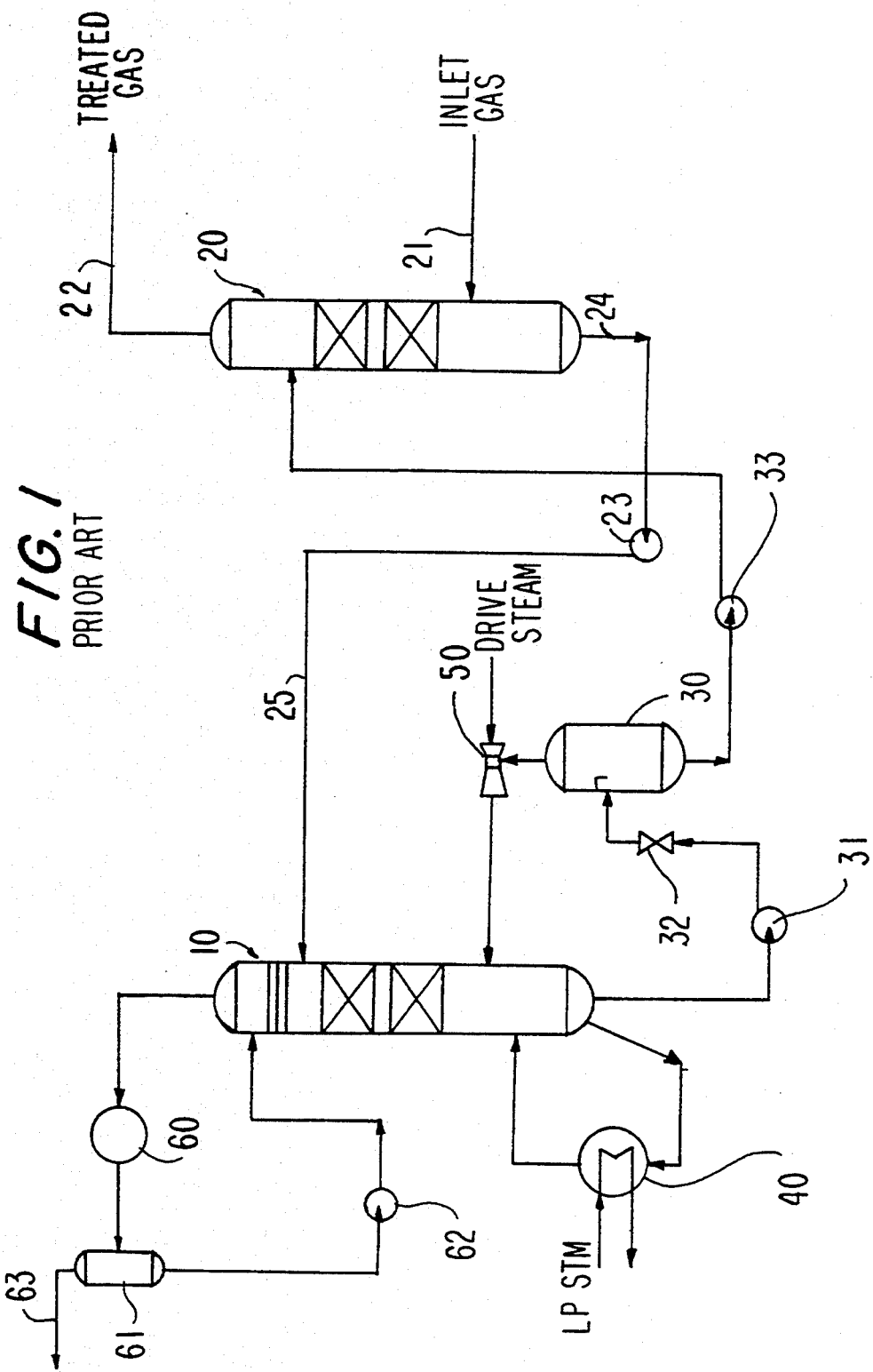
FIG. 1 is a process flow diagram of a prior art acid gas removal process using a conventional flash tank configuration for heat recovery from the hot lean solution.

A typical single stage acid gas removal installation is shown in FIG. 1. As shown in FIG. 1 lean solution from the regenerator 10 is fed via a charge pump 31 to a flash tank 30. Vapors leaving the flash tank are recompressed in a steam jet 50 and returned to the regenerator to reduce the heat duty of the reboiler 40. Lean solution from the flash tank is fed via a lean pump 33 to the absorber 20. The treated gas 22 is returned from the absorber 20.

In single-stage designs, the inlet gas 21 is fed into the absorber 20 and is scrubbed countercurrently by the lean solution in the absorber 20. The rich solution from the absorber 20 is fed by line 24 to the rich pump 23 and then fed by line 25 to the regenerator 10, where the rich solution is regenerated countercurrent to steam from the reboiler 40 in the regenerator 10. Overhead vapors are fed from the regenerator 10 to the OVHD (overhead) Cooler 60 which compresses the vapors to form a solution and gas which is then fed to a storage tank, K.O. Drum 61. The acid gas is removed by a line 63 from the K.O. Drum 61 and the solution is fed by a line from the K.O. Drum 61 to a Cond (condensate) pump 62, which in turn feeds the condensate back to the regenerator 10.

Both the absorber 20 and the regenerator 10 can be either packed towers or trayed towers. This design can be used when a very high purity is not required in the treated gas. ($CO_2$ partial pressure of about 2 PSI or more.)

The lean and/or semi-lean solution from the regenerator 10, which is at its boiling point, is flashed to a lower pressure in the flash tank 30. The flashed vapors are mostly steam with some acid gas. The vapors are compressed to the regenerator and used to reduce the reboiler heat duty. They can be compressed using either a steam jet 50 (thermo-compressor) or a mechanical compressor.

The use of such technology reduces the overall heat requirements and, therefore, the heat transfer surface in the reboiler and the overhead acid gas cooler. Additionally, it can lower the circulation rate and therefore the pump cost and the diameter of the absorber.

The additional equipment in FIG. 1, which is necessary to operate the prior art heat recovery system includes the (vertical or horizontal) flash tank 30, the charge pump 31, a pressure let down valve 32 in the line from the charge pump to the flash tank 30, an additional level control system (not shown) in the flash tank and the appurtenant external piping.

The disadvantages of this type of system are the higher investment in equipment and operating expense, additional mechanical maintenance, the need for a larger solution inventory, larger space requirements and limitations on turndown. In this latter regard, turndown is limited by the need to observe a minimum flow rate of the charge pump, the need to avoid control valve cavitation, vertical riser stability and over vacuum on the flash tank.

Figure 2:
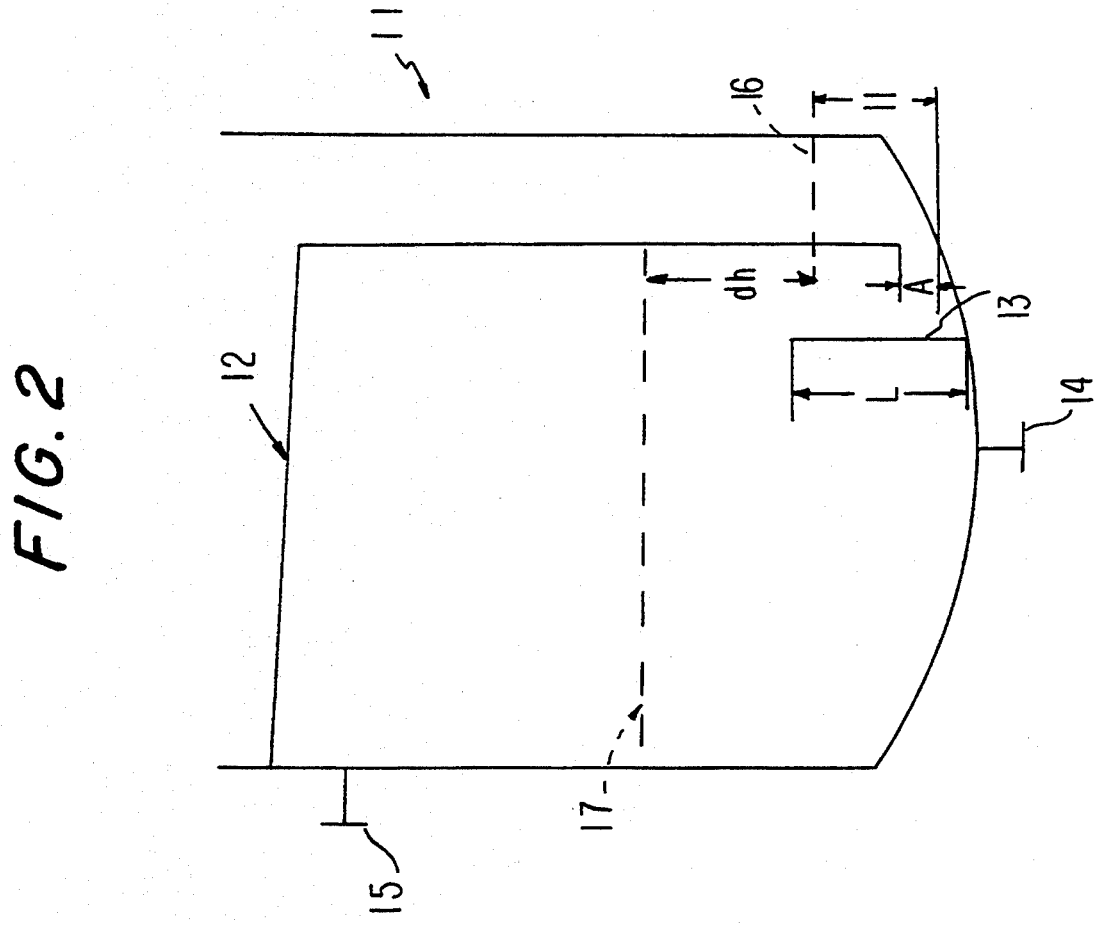
FIG. 2 is a cross-sectional view of a single-stage internal flash section of a regenerator in accordance with the invention.
Figure 3:
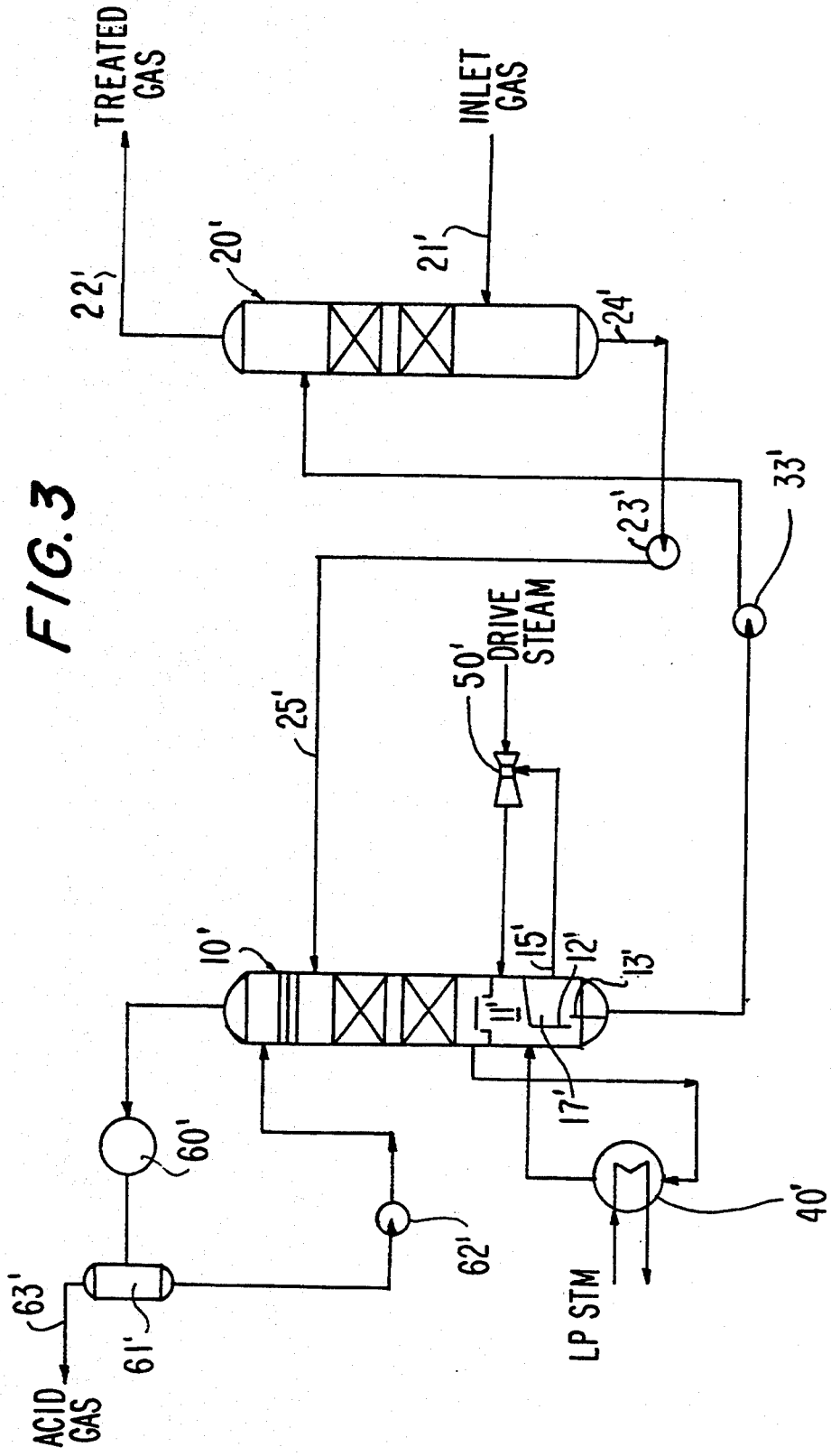
FIG. 3 is a process flow diagram of an acid gas removal process employing a regenerator with a single-stage internal flash section in accordance with the invention.
Figure 4:
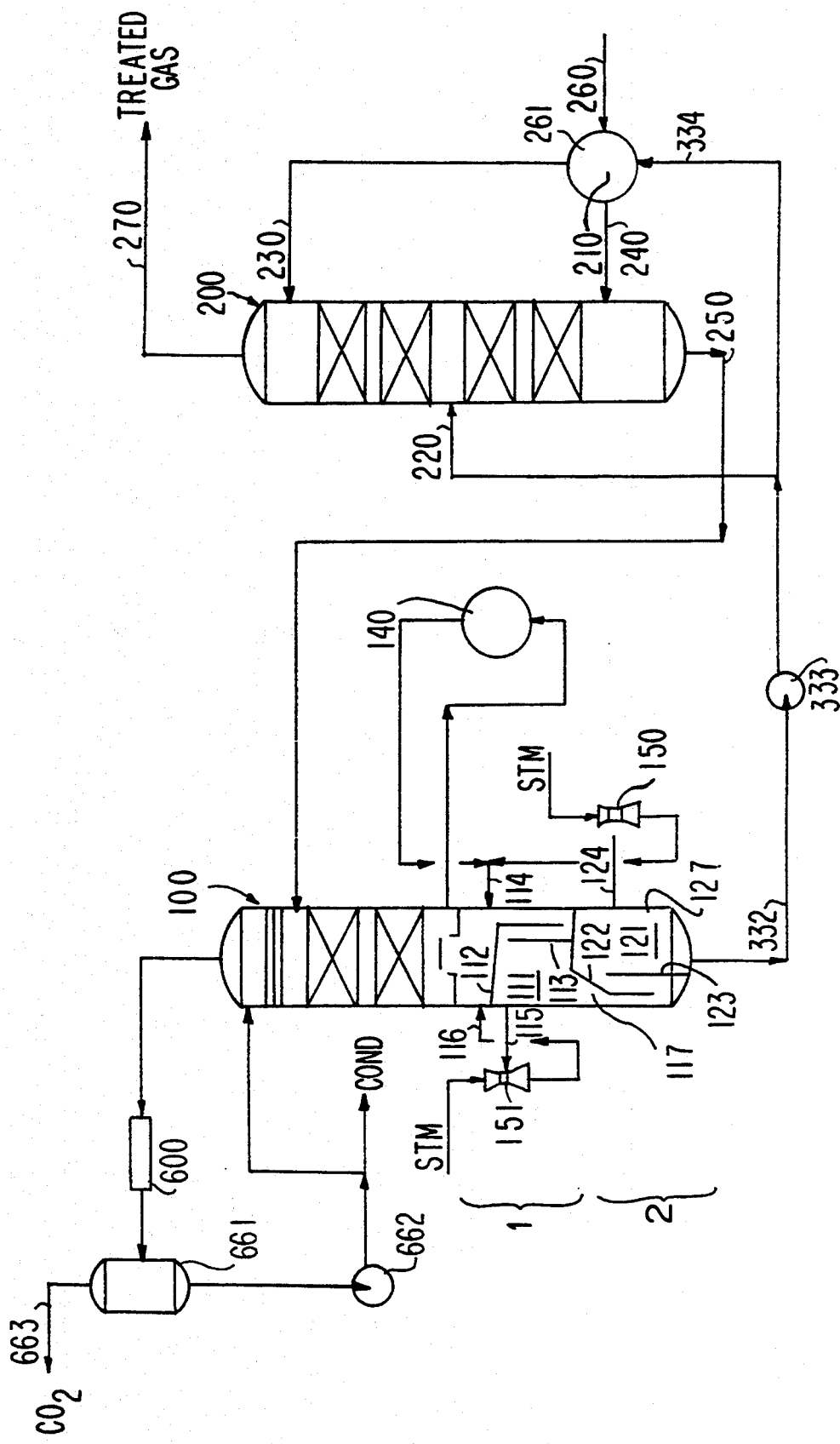
FIG. 4 is a process flow diagram of an acid gas removal process employing a regenerator with a multiple-stage internal flash section in accordance with the invention.

Accordingly, the present invention improves [a need exists for improving] upon existing flash tank configurations for heat recovery in the foregoing process of FIG. 1 as disclosed in more detail herein below. An improvement upon existing flash tank configurations is illustrated in FIG. 2 by an internal flash section according to the present invention, i.e. the bottom of a modified regenerator. The present invention as illustrated by FIGS. 3 and 4 improve on the foregoing process by the use of a modified regenerator incorporating an internal flash system.

As shown in FIG. 2, the regenerator in accordance with the invention includes an internal flash section 11 at the bottom of the regenerator. The flash section 11 includes side wall portions and a bottom partition 12 appended to a side wall portion, which bottom partition 12 is defined by a horizontal member and a verticle member depending from the horizontal member. FIG. 2 further illustrates an optional baffle 13. The internal flash section 11 also comprises a first pressure side, a second pressure side having a lower pressure than the first pressure side during gas flow, and a pressure reducing means for generating a pressure drop between a first pressure side and a second pressure side during gas flow, wherein the pressure drop is due to the second pressure side liquid head and liquid flow pressure losses occurring as liquid flows from the first pressure side to the second pressure side through a spacing between the vertical member of the bottom partition and the bottom of the internal flash section. Vapor is withdrawn via vapor outlet 15 from the space defined by a side wall of the flash section 11 comprising vapor outlet 15, portions of the horizontal and vertical members of a bottom partition 12 and a second pressure side 17 liquid level. There is a differential liquid head dh between a first pressure side 16 and a second pressure side 17.

In FIG. 2, the spacing A (defined by a bottom portion of the vertical member of the bottom partition 12 and the bottom of the flash section 11) provides a pressure drop at design flow rates which contributes to the pressure differential dh. As the flow rate increases, the pressure head H on the first pressure side 16 will tend to increase. Conversely, as flow rate drops H will drop as well. The lower effective limit of the first pressure head H is the spacing A between the vertical member of bottom partition 12 and the bottom of the flash section 11. Thus, at extremely low flow rates as H drops to height A, the liquid seal between the first pressure side 16 and the second pressure side 17 will be broken thereby preventing overvacuum.

Spacing A can be designed to achieve any desired pressure differential dh within design flow rates. The pressure drop due to spacing A can be readily determined using known engineering calculations that will be appreciated by persons skilled in the art.

Alternative pressure drop generating structures such as orifices and the like can be substituted for, or augment, the spacing A. For example, the vertical member of bottom partition 12 can incorporate orifices, e.g. orifice plates, disposed therein (not shown). If desired, the orifices can be removably mounted in the vertical member of bottom partition 12 for substitution of varying sized orifices depending on the desired flow rates and pressure drops. An access panel can be provided in the regenerator 10 for changing orifice plates after installation. The vertical member of bottom partition 12 can also incorporate a slidable gate (not shown) which can be used to vary the spacing A.

The baffle 13 is not required in single stage flash sections as shown in FIG. 2. However, the baffle 13 is useful in multiple stage flash sections, described below. In this latter regard, the baffle 13 cooperates with the vertical member of bottom partition 12 to create a riser therebetween. In operation the riser will be filled with lean solution and its overflow at the top will proceed to accumulate and flow back into the space between the vertical member of bottom partition 12 and the side wall of flash section 11 of the first pressure side of the previous flash stage to form the first pressure side 16 liquid level, or during steady state operation will simply flow out to the liquid outlet 14 as shown in FIG. 2.

In multi-stage internal flash section designs, the length L of the baffle 13 in at least the upper flash stages should be chosen to provide a riser having a minimum length (measured from the bottom of the vertical member of bottom partition 12 to the top of the baffle 13) at least equal to, and preferably greater than, the [low] second pressure side liquid level 17 (H+dh) at the lowest expected flow rate.

A single stage system including the modified regenerator in accordance with the invention is shown in FIG. 3. Vapor is withdrawn from the second pressure side 17' of the flash section 11' via vapor outlet 15' (wherein structures 11', 15' and 17' of FIG. 3 correspond to FIG. 2 structures 11, 15 and 17, respectively, as described above for FIG. 2) by a steam jet 50'. This vapor is recompressed and returned to the regenerator 10' thereby reducing the heat duty on the reboiler 40'.

In FIG. 3 (as described above for FIG. 1), the inlet gas 21' is fed into the absorber 20' and is scrubbed countercurrently by the lean solution in the absorber 20'. The rich solution from the absorber 20' is fed by line 24' to the rich pump 23' and then fed by line 25' to the regenerator 10', where the rich solution is regenerated countercurrent to steam from the reboiler 40' in the regenerator 10'. Overhead vapors are fed from the regenerator 10' to the OVHD (overhead) Cooler 60' which compresses the vapors to form a solution and gas which is then fed to a storage tank, K.O. Drum 61'. The acid gas is removed by a line 63' from the K.O. Drum 61' and the solution is fed by a line from the K.O. Drum 61' to a Cond (condensate) pump 62', which in turn feeds the condensate back to the regenerator 10'.

The regenerator in accordance with the invention uses gravitational flow to feed the internal flash section at the bottom of the regenerator, eliminating the need for an external flash tank, and charge pump even without vacuum. The seal between the first pressure and second pressure sides, which is provided by the liquid head H, also eliminates the need for a pressure let down valve. Vacuum control is provided by the first pressure side liquid level. As described above, this also avoids overvacuum at reduced capacities.

Additionally, since the flash section at least in part occupies what would otherwise be regenerator solution surge space, this results in greater equipment economy. Elimination of the external flash system also reduces the total volume of regenerator solution required to operate the system.

Other process flow schemes can be used wherein the regenerator 10' is modified to include an internal flash section 11' to enhance its operation. Examples of such alternative process flow schemes include split-cooled lean designs and two stage designs.

In split-cooled lean designs, a small portion of the lean solution is cooled and sent to the top of the absorber permitting a greater purity of the treated gas. The bulk of the lean solution is sent hot to the middle of the absorber, thereby improving the heat efficiency of the system. $CO_2$ partial pressures of about 0.3 PSI are achievable in the treated gas.

Two-stage designs are generally the most heat efficient configurations when a high purity of treated gas is required, such as 4 PPM $H_2S$ and/or 50–1500 PPM $CO_2$. Two stages of absorption and regeneration may be used. The bulk of the solution is circulated as a semi-lean solution. A minor portion (about 10–30%) of the total solution is then thoroughly regenerated and cooled to be circulated as a lean solution.

A particularly preferred process flow scheme is shown in FIG. 4. The regenerator 100 includes two flash sections 111 and 121, each flash section comprising a first pressure side and a second pressure side having a lower pressure than the corresponding first pressure side during gas flow. The flash sections 111 and 121 comprise, respectively, bottom partitions 112, 122 (wherein each bottom partition is defined by a horizontal member and a vertical member depending from the horizontal member) and baffles 113, 123. Vapor from the respective second pressure sides 117, 127 is recompressed and returned to the regenerator 100. Vapor is withdrawn from second pressure side 117 of flash section 111 via vapor outlet 115, which is located on the second pressure side wall of flash section 111, by a steam jet 151 and returned to the regenerator 100 via regenerator inlet 116. Likewise, vapor is withdrawn from second pressure side 127 of flash section 121 via vapor outlet 124, which is located on the second pressure side wall of flash section 121, by a steam jet 150 and returned to the regenerator 100 via regenerator inlet 114.

Lean solution is fed from the regenerator 100 via line 332 to lean pump 333 and is then fed via line 220 to an intermediate point in absorber 200. The lean solution is also fed from lean pump 333 via line 334 through a heat exchanger 261 and on through line 230 to the top of absorber 200 where the treated gas 270 then exits absorber 220. The lean solution which is fed by line 334 into the heat exchanger 261 is cooled in the lean cooler 210 of heat exchanger 261 by incoming gas from in line 260. The thus heated gas passes through line 240 into the bottom of absorber 200 and passes countercurrent to the lean solution fed via lines 220, 230. Rich solution exits the bottom of the absorber 200 and is fed via line 250 to the top of the regenerator 100.

In FIG. 4 overhead vapors from the regenerator 100 are treated in a manner analogous to that described in FIG. 1 for corresponding overhead vapors and structures. Overhead vapors are fed from the regenerator 100 to the OVHD (overhead) Cooler 600 which compresses the vapors to form a solution and gas which is then fed to a storage tank, K.O. Drum 661. The $CO_2$ gas is removed by a line 663 from the K.O. Drum 661 and the solution is fed from the K.O. Drum 661 to a Cond (condensate) pump 662, which in turn feeds the condensate back to the regenerator 100. Also, as shown in FIG. 4, steam is removed from the regenerator 100 and fed to the reboiler 140 in a manner analogous to that illustrated in FIG. 1 for the regenerator 10 and the reboiler 40. In turn, the reboiler 140 returns steam to the regerator inlet 114 on the side wall of the regenerator 100.

Any number of multiple flash sections can be accommodated in the regenerator. In addition, if desired, one or more external flash systems can be incorporated as an adjunct to the internal flash section or sections in the regenerator in accordance with the invention. The external flash systems can be used as first, intermediate or final flash stages in systems wherein multiple flash stages are desired. For example, in an existing plant which is already equipped with one or more external flash systems, the regenerator can be modified by incorporating one or more flash sections in accordance with the invention, In the latter case, the external flash system could be bypassed completely when reduced capacity is warranted, e.g. during plant turndown when the entire regeneration system is operating at lower capacity.

As will be apparent to persons skilled in the art, various modifications to these specific embodiments of the invention can be envisioned which nevertheless employ the inventive concepts disclosed herein. Accordingly, the scope of the invention is not intended to be limited to these specific disclosed embodiments, but rather is intended to be defined by the claims set forth below.

What is claimed is:

1. An absorbent solution regenerator for removing acid gases from gas mixtures, said regenerator comprising at least one rich solution inlet, at least one overhead vapor outlet, at least one lean solution inlet, at least one steam inlet, at least one steam outlet, and at least one internal flash section at the bottom portion of the regenerator;

said at least one internal flash section comprising side wall portions, at least one vapor inlet, at least one vapor outlet, at least one liquid outlet, at least one bottom partition appended to a side partition and said bottom partition is defined by a horizontal member and a vertical member depending from the horizontal member, and having a vapor space formed therein defined by a portion of at least one side wall of said side wall portions and portions of the horizontal and vertical members of said at least one bottom partition, said internal flash section including a first pressure side, a second pressure side having a pressure lower than the first pressure side during gas flow and a pressure reducing means comprising a spacing between the vertical member of the bottom partition and bottom of said internal flash section for generating a pressure drop between the first pressure and second pressure side during gas flow; and said internal flash section including a means for preventing overvacuum at low flow rates of said gas mixtures.

2. The absorbent solution regenerator of claim 1, wherein the internal flash section includes a bottom partition defined by a horizontal member and a vertical member depending from the horizontal member separating the first pressure side from the second pressure side of the flash section, the vertical member being displaced from the bottom of the flash section by a spacing, said spacing and a vapor removal means connected to the vapor outlet of the flash section providing the pressure reducing means, which limits the pressure differential between the first pressure side and the second pressure side during gas flow.

3. The absorbent solution regenerator of claim 2, further including a baffle mounted on the bottom of the flash section and so spaced from the bottom partition as to define a riser therebetween.

4. The absorbent solution regenerator of claim 3, wherein the length of the baffle is sufficient to define a riser between the baffle and the bottom partition having a length measured from the bottom of the bottom partition to the top of the baffle at least equal to the low pressure side liquid level at the lowest expected flow rate.

5. The absorbent solution regenerator of claim 4, comprising a plurality of flash sections arranged in series, each flash section comprising a bottom partition dividing the high pressure side from the low pressure side of the flash section and a baffle mounted on the bottom of the flash section and spaced from the bottom partition, and the low pressure side of the first and any succeeding flash section defining the high pressure side of the second and any succeeding flash section.

6. An absorbent solution regenerator according to claim 3, wherein the baffle is removable.

7. An absorbent solution regenerator according to claim 3, wherein the baffle has a means for adjusting the length of the baffle.

8. The absorbent solution regenerator of claim 1, wherein the at least one bottom partition of the at least one internal flash section comprises a means for varying the spacing between the bottom of the internal flash section and the vertical member of said at least one bottom partition.

9. The absorbent solution regenerator of claim 8, wherein said means for varying the spacing between the internal flash section and the vertical member of said at least one bottom partition comprises a removable slidable gate.

10. The absorbent solution regenerator of claim 8, wherein said means for varying the spacing between the internal flash section and the vertical member of said at least one bottom partition comprises at least one orifice.

11. The absorbent solution regenerator of claim 8, wherein said means for varying the spacing between the internal flash section and the vertical member of said at least one bottom partition comprises at least one orifice plate having a means for varying the number or size of at least one orifice.

12. An absorbent solution regenerator for removing acid gases from gas mixtures, said regenerator comprising at least one rich solution inlet, at least one overhead vapor outlet, at least one lean solution inlet, at least one steam inlet, at least one steam outlet, and a single stage internal flash section comprising:
  (1) a bottom partition defined by a horizontal member and a vertical member depending from the horizontal member, said bottom partition dividing the flash section into a first pressure side and a second pressure side with a pressure lower than the first pressure side during gas flow;
  (2) vapor outlet means in the low pressure side of the flash section disposed above the liquid level therein;
  (3) liquid outlet means in the low pressure side of the flash section disposed below the liquid level therein; and
  (4) pressure reducing means during gas flow defined by a spacing between the vertical member of the bottom partition and the bottom of the flash section, a vapor removal means connected to the vapor outlet means of the flash section, and a liquid removal means connected to the liquid outlet means of the flash section, said pressure reducing means comprising a means for generating a pressure drop between the first pressure side and second pressure side defined by a spacing between the vertical member of the bottom partition and the bottom of the flash section, said spacing being a means for limiting the pressure differential between the first pressure side and the second pressure side during gas flow.

13. The absorbent solution regenerator of claim 12, further including a baffle mounted on the bottom of the flash section and so spaced from the vertical member of the bottom partition as, to define a riser therebetween.

14. An absorbent solution regenerator according to claim 13, wherein the baffle is removable.

15. An absorbent solution regenerator according to claim 13, wherein the baffle has a means for adjusting the length of the baffle.

16. An absorbent solution regenerator for removing acid gases from gas mixtures, said regenerator comprising at least one rich solution inlet, at least one overhead vapor outlet, at least one lean solution inlet, at least one steam inlet, at least one steam outlet, and a two-stage internal flash section including:
  (a) a first internal flash section comprising:
    (i) a bottom partition defined by a horizontal member and a vertical member depending from the horizontal member, said bottom partition dividing the flash section into a first pressure side and a second pressure side with a pressure lower than the first pressure side during gas flow;
    (ii) vapor outlet means in the second pressure side of the flash section disposed above the liquid level therein;
    (iii) liquid outlet means in the second pressure side of the flash section disposed below the liquid level therein and communicating with the first pressure side of the second stage internal flash section;
    (iv) pressure reducing means defined by a spacing between the vertical member of the bottom partition and the bottom of the flash section, a vapor removal means connected to the vapor outlet means of the flash section, and the liquid outlet communicating with the second stage internal flash section, said pressure reducing means comprising a means for generating a pressure drop between the first pressure side and second pressure side defined by a spacing between the vertical member of the bottom partition and the bottom of the flash section, the spacing being a means for limiting the pressure differential between the high pressure side and the low pressure side during gas flow; and
    (v) a baffle mounted on the bottom of the flash section and so spaced from the vertical member of the bottom partition as to define a riser therebetween, the length of the baffle being such that the length of the riser measured from the bottom of the bottom partition to the top of the baffle is at least equal to the second pressure side liquid level at the lowest expected flow rate;
  (b) a second internal flash section comprising
    (i) a second bottom partition defined by a horizontal member and a vertical member depending from the horizontal member, said second bottom partition dividing the flash section into a second first pressure side communicating with the second pressure side of the first internal flash section and into a second second pressure side with a pressure lower than the second first pressure side during gas flow;
    (ii) second vapor outlet means in the second pressure side of the second flash section disposed above the liquid level therein;
    (iii) second liquid outlet means in the second pressure side of second flash section disposed below the liquid level therein;
    (iv) a second pressure reducing means comprising a spacing between the vertical member of the second bottom partition and the bottom of the second flash section, a second vapor removal means connected to the second vapor outlet means of the second flash section, and a second liquid removal means connected to the second liquid outlet means of the second flash section, said pressure reducing means comprising a means for generating a pressure drop between the first pressure side and second pressure side of the second flash section defined by a spacing between the vertical member of the second bottom partition and the bottom of the second flash section, the spacing being a means for limiting the pressure differential between the first pressure side and the second pressure side of the second flash section during gas flow; and
    (v) a second baffle mounted on the bottom of the second flash section and so spaced from the vertical member of the second bottom partition as to define a second riser therebetween, the length of the second baffle being such that the length of the second riser measured from the bottom of the vertical member of the second bottom partition to the top of the second baffle is at least equal to the second second pressure side liquid level at the lowest expected flow rate.

17. The absorbent solution regenerator of claim 16, wherein the baffle mounted on the bottom of the first flash section is removable.

18. The absorbent solution regenerator of claim 16, wherein the second baffle mounted on the bottom of the second flash section is removable.

19. The absorbent solution regenerator of claim 16, wherein the baffle mounted on the bottom of the first flash section has a means for adjusting the length of the baffle.

20. The absorbent solution regenerator of claim 16, wherein the second baffle mounted on the bottom of the second flash section has a means for adjusting the length of the baffle.

* * * * *